(12) United States Patent
Schulz et al.

(10) Patent No.: US 11,320,444 B2
(45) Date of Patent: May 3, 2022

(54) PROCESSING SYSTEM AND METHOD FOR PROCESSING A MICROFLUIDIC CARTRIDGE WITH A PROCESSING UNIT

(71) Applicant: Robert Bosch GmbH, Stuttgart (DE)

(72) Inventors: Martin Schulz, Winterbach (DE); Jochen Rupp, Stuttgart (DE); Christian Dorrer, Winnenden (DE); Karsten Seidl, Mülheim an der Ruhr (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 16/349,011

(22) PCT Filed: Oct. 26, 2017

(86) PCT No.: PCT/EP2017/077451
§ 371 (c)(1),
(2) Date: May 10, 2019

(87) PCT Pub. No.: WO2018/086898
PCT Pub. Date: May 17, 2018

(65) Prior Publication Data
US 2019/0265259 A1     Aug. 29, 2019

(30) Foreign Application Priority Data

Nov. 10, 2016   (DE) .................. 10 2016 222 075.6

(51) Int. Cl.
*G01N 35/00* (2006.01)
*B01L 3/00* (2006.01)

(52) U.S. Cl.
CPC .. *G01N 35/00732* (2013.01); *B01L 3/502715* (2013.01); *B01L 3/545* (2013.01);
(Continued)

(58) Field of Classification Search
CPC ....... G01N 35/00732; G01N 35/00722; G01N 35/00584
(Continued)

(56) References Cited

U.S. PATENT DOCUMENTS 7,191,094 B2 * 3/2007 Seher .................. A61B 90/96
                                                       702/182
2005/0110640 A1 * 5/2005 Chung ................. H01Q 21/24
                                                       340/572.1
(Continued)

FOREIGN PATENT DOCUMENTS

DE      102 26 212 A1   12/2003
EP      2 120 052 A1    11/2009
(Continued)

OTHER PUBLICATIONS

International Search Report corresponding to PCT Application No. PCT/EP2017/077451, dated Mar. 19, 2018 (German and English language document) (6 pages).

*Primary Examiner* — Christine T Mui
(74) *Attorney, Agent, or Firm* — Maginot, Moore & Beck LLP (57) ABSTRACT

A processing system includes a processing unit configured to process a cartridge, in particular a microfluidic cartridge, and is further configured to process a biological sample received in the cartridge. The processing unit includes a computing unit configured to compare input or read in sample data with input or read in first cartridge data in order to determine a compatibility of the sample with the cartridge. The computing unit is further configured to output a first error message in response to a determination of incompatibility between the sample and the cartridge. A method includes using the processing system to determine a compatibility between a sample and a cartridge.

13 Claims, 3 Drawing Sheets

(52) U.S. Cl.
CPC ..... *B01L 2200/14* (2013.01); *B01L 2300/021* (2013.01); *B01L 2300/022* (2013.01); *B01L 2300/024* (2013.01); *B01L 2300/0816* (2013.01); *G01N 2035/00801* (2013.01); *G01N 2035/00821* (2013.01); *G01N 2035/00831* (2013.01)

(58) Field of Classification Search
USPC .......................................................... 436/43
See application file for complete search history.

(56) References Cited

U.S. PATENT DOCUMENTS

| | | |
|---|---|---|
| 2014/0030800 A1 | 1/2014 | Moses et al. |
| 2015/0056099 A1 | 2/2015 | Peeters |
| 2016/0069918 A1 | 3/2016 | Holmes et al. |
| 2016/0131672 A1 | 5/2016 | Tieman et al. |

FOREIGN PATENT DOCUMENTS

| | | |
|---|---|---|
| EP | 2 230 520 A1 | 9/2010 |
| EP | 2 611 042 A1 | 7/2013 |
| JP | 2005-530249 A | 10/2005 |
| JP | 2009-030981 A | 2/2009 |
| JP | 2015-505047 A | 2/2015 |
| JP | 2015-161521 A | 9/2015 |
| JP | 2017-534068 A | 11/2017 |

* cited by examiner

PROCESSING SYSTEM AND METHOD FOR PROCESSING A MICROFLUIDIC CARTRIDGE WITH A PROCESSING UNIT

This application is a 35 U.S.C. § 371 National Stage Application of PCT/EP2017/077451, filed on Oct. 26, 2017, which claims the benefit of priority to Serial No. DE 10 2016 222 075.6, filed on Nov. 10, 2016 in Germany, the disclosures of which are incorporated herein by reference in their entirety.

BACKGROUND

When performing tests and analyses of samples in the clinical laboratory, samples are usually processed together with personal data, in particular patient data. In this context it is of particular interest to ensure that no accidental confusion of samples, patient information or results occurs.

Particularly in the case of automated analysis systems, such as lab-on-a-chip systems for in vitro diagnostics, high demands are placed on the correct sequence of the test or the analysis. To provide unambiguous identification of the sample, this usually involves human- and/or machine-readable information being supplied with the sample.

A lab-on-a-chip cartridge with integrated RFID for transmitting information relevant to the sample is known, for example, from EP 2611042 B1, US 20150056099 A1 and US 20140030800 A1.

SUMMARY

The disclosure relates to a method for processing a cartridge, in particular a microfluidic cartridge, and a biological sample with a processing unit, which is received into the cartridge. In a first step, sample data is entered or read into the processing unit, before the sample is inserted into the cartridge and before the cartridge is received into the processing unit. In a second step, initial cartridge data is entered or input into the processing unit. Alternatively, the entry or reading of the initial cartridge data can be carried out even before the entry or reading of the sample data. The input of the sample data and/or the first cartridge data can be carried out manually by a user via an input device of the processing unit, for example using a keypad or a touch screen of the processing unit. Alternatively, the sample data and/or the first cartridge data can be read in, for example, via an optical reader of the processing unit, such as a code scanner. In a third step a comparison of the sample data with the first cartridge data for compatibility of the sample with the cartridge is performed by the processing unit, wherein the comparison is carried out, for example, in a dedicated computing unit, also called a processor, of the processing unit. In a fourth step a first error message is issued by the processing unit, if no compatibility of the sample with the cartridge can be detected by the processing unit. The message can be issued, for example, optically via a display of the processing unit or acoustically via a speaker of the processing unit. If no first error message appears, in a fifth step the sample is inserted into the cartridge and the cartridge is received into the processing unit for further processing.

The processing unit may be understood to mean, in particular, an analysis unit for analyzing the biological sample received in the cartridge, in particular a microfluidic processing unit. The biological sample can be, in particular, a blood sample, a urine sample, a saliva sample or a sample taken from a swab. A processing of the sample can be understood, in particular, to mean the performance of a test with the sample, using the cartridge into which the sample is received. For example, the test can take the form of an assay, in particular a molecular-biological assay, for example for detecting a particular substance or specific pathogens such as viruses, bacteria or fungi in the sample. Typically, a cartridge is designed for one or more tests or analysis procedures with one or more specified samples. This means in particular that one or more predefined test steps for a test can be performed by actuating the cartridge using the processing unit. For example, the cartridge can be designed to carry out an assay for one of the biological samples referred to above in conjunction with the processing unit. A compatibility of the sample with the cartridge can be understood to mean, in particular, that the sample is suitable for the test that can be performed using the cartridge, such as a blood sample with a cartridge designed for detecting pathogens in blood.

Furthermore, the compatibility of the sample with the cartridge can preferably be understood to mean that an expiration date of the sample and/or the cartridge has not yet been exceeded, since after the expiry of the shelf life, reliable tests can no longer be carried out with the sample and thus the cartridge is not or no longer compatible with the sample.

The processing unit can be configured to load a processing procedure which is compatible with the first cartridge, from a memory of the processing unit. Specific processing procedures compatible with different cartridge types, in particular different molecular biological assays, are preferably stored in the memory.

The method according to the disclosure has the advantage that the processing unit detects and informs the user as to whether a sample is in principle compatible with a cartridge. As mentioned above, it is advantageously detected by the processing unit whether the test is suitable for the test that can be performed by the cartridge. This advantageously reduces the risk that samples might be rendered unusable by being received into a cartridge which is unsuitable for the given sample. This is particularly advantageous when the samples are biological samples from human beings, especially patients, since in addition to the high costs of obtaining such samples, the procedure is typically associated with a physical and mental stress on the part of the human sample donors. The method according to the disclosure thus advantageously reduces the risk that samples become unusable due to incorrect processing. As described above, the unsuitable cartridge might be, for example, the wrong cartridge for a test to be carried out or a cartridge which has exceeded its expiry date. The early warning given to the user in the processing procedure advantageously reduces the risk that a sample will become unusable by insertion into an unsuitable cartridge, or conversely by inserting an unsuitable sample into a cartridge the cartridge becomes unusable.

In a particularly advantageous extension of the method according to the disclosure, in a sixth step second cartridge data is read into the processing unit from the cartridge, the reading being carried out after the cartridge has been received into the processing unit. In a seventh step a comparison of the first cartridge data with the second cartridge data is performed by the processing unit to check for an identical identification data set, the comparison process being carried out, for example, by a dedicated calculation unit of the processing unit. If the first cartridge data and the second cartridge data do not include the identical identification data set, in an eighth step a second error message is issued by the processing unit. The identification data set can be, for example, an alphanumeric character string, by means of which the cartridge can be uniquely identified.

This extension of the method according to the disclosure has the advantage that prior to the start of the further processing of the cartridge received in the processing unit, a check is made to ensure that the received cartridge is the same cartridge whose first cartridge data was entered or read into the processing unit. This can be advantageously used in the event of several cartridges being used in parallel, in particular identical cartridges with different samples, and/or processing units, to prevent the wrong cartridge units from being processed by the processing unit and, in particular, thereby processing the wrong sample. This extension of the method according disclosure thus advantageously further reduces the risk that samples or cartridges become unusable due to incorrect processing.

In an advantageous design of the disclosure the first cartridge data and the second cartridge data are the same cartridge data, which can be read in or entered multiple times. This has the advantage that two different data records do not need to be kept.

In accordance with an advantageous design of the disclosure, the scanning of the first and/or second cartridge data is performed via a transponder, in particular an RFID chip, of the cartridge, wherein the transponder is arranged in particular in an area inaccessible to a user, preferably an interior of the cartridge. An area inaccessible to the user may be understood, in particular, to mean an area of the cartridge to which the user can only gain access by at least partially destroying the cartridge. This has the advantage that the possibility of manipulation of the transponder is made more difficult.

Preferably, the transponder is irreversibly connected to a part of the cartridge, for example, a cover of the cartridge, in an irreversible way, such as via a snap-in connection. An irreversible connection in this case is understood to mean a connection that can only be released in particular by at least the partial destruction of the transponder or of the part that is connected to the transponder. As a result of this irreversible connection, the risk of unwanted manipulation of the cartridge can be further reduced.

According to a further advantageous design of the disclosure, the first cartridge data is read in via an optical scanning of the first cartridge data applied to an outer side of the cartridge, wherein the first cartridge data is applied, in particular, in the form of a one- or two-dimensional code. This has the advantage that the first cartridge data can be scanned in a simple manner via an optical reader of the processing unit. If the reader of the processing unit is configured to allow a readout of the first cartridge data outside of the cartridge, the further advantage exists that due to the application of the first cartridge data on the outside of the cartridge the user is prevented from inserting the cartridge in the processing unit before the first cartridge data is read in.

In a particularly advantageous extension of the disclosure, an expiry date of the cartridge included in the first or second cartridge data is compared with a current date by the processing unit, and if the current date exceeds the expiry date an error message is issued by the processing unit.

In a further advantageous extension of the disclosure, after completion of the processing, information about the completed use of the cartridge is deposited in a memory of the cartridge, for example in a memory of the transponder. This information then preferably forms part of the first or second cartridge data. This has the advantage that in the event of a mistaken intention to re-use the same cartridge, a previously completed usage can be detected by the processing unit. If the first cartridge data and the second cartridge data are not the same cartridge data, it is preferred that the information about the non-usability forms part of the first cartridge data. This has the advantage that a non-usability can be detected before the sample is inserted into the cartridge.

Preferably, if the cartridge is identified as unusable when processing the first or second cartridge data, information about the non-usability is stored in a memory of the cartridge, for example, in a memory of the transponder. This information then preferably forms part of the first or second cartridge data. This has the advantage that in the event of a mistaken intention to re-use the same cartridge, the non-usability of the cartridge can be detected by the processing unit. If the first cartridge data and the second cartridge data are not the same cartridge data, it is preferable that the information about the non-usability forms part of the first cartridge data. This has the advantage that a non-usability can be detected before the sample is inserted into the cartridge.

Preferably, an error message is issued by the processing unit if either the non-usability of the cartridge or the information about the already completed use of the cartridge is detected during processing of the first or second cartridge data. The error message in this case can be issued, for example, optically via a display of the processing unit or acoustically via a loudspeaker of the processing unit. This advantageously enables the user to be informed about an unusable cartridge.

In a particularly preferred extension of the disclosure in the transponder, in particular in a memory of the transponder of the cartridge, a kill-switch for an irreversible destruction of the transponder is set if an expiry date of the cartridge is detected by the processing unit as being exceeded. A kill-switch here can be understood to mean, in particular, an electrical destruction, for example, using a high current, wherein in particular the memory is irreversibly destroyed, so that in the event of a repeated attempted readout of the memory no cartridge data can be read out completely. In addition, the kill-switch can preferably be set if an already completed prior use of the cartridge is detected by the processing unit. Alternatively, the first and/or second cartridge data in a memory of the cartridge can be deleted if the exceedance of the expiry date and/or the previously completed use of the cartridge has been detected by the processing unit.

The subject matter of the disclosure also relates to a processing unit for processing a cartridge, in particular a microfluidic cartridge, and a biological sample which is received into the cartridge. The processing unit has a calculation unit, wherein the calculation unit is configured to compare entered or scanned sample data with entered or scanned first cartridge data for the compatibility of the sample with the cartridge and to issue a first error message if no compatibility of the sample with the cartridge can be determined by the processing unit. In relation to the advantages and definitions of the processing unit according to the disclosure and the following extensions, reference is made to the above comments.

In a particularly preferred extension of the disclosure the calculation unit is additionally configured to compare entered or scanned first cartridge data with second cartridge data read in by the cartridge for an identical identification data set and to issue a second error message if the first cartridge data and the second cartridge data do not include the identical identification data set.

The processing unit, in particular the calculation unit of the processing unit, can preferably be configured in such a way that an opening in a bay of the processing unit for receiving the cartridge is only carried out after the scanning or entry of the first cartridge data, in particular only after a positive comparison of the first cartridge data with a procedure for processing the cartridge stored in a memory of the processing unit. This has the advantage that no cartridges can be accepted into the processing unit that cannot be processed.

The subject matter of the disclosure is also a cartridge, in particular a microfluidic cartridge, for processing a biological sample received into the cartridge. The cartridge comprises first cartridge data applied to an outer side of the cartridge. The cartridge also comprises a transponder, in particular an RFID chip, wherein the transponder comprises a memory for second cartridge data to be deposited or already deposited therein, wherein the first cartridge data and the second cartridge data comprise an identical identification data set. In relation to the advantages and definitions of the cartridge according to the disclosure and the following extensions and designs, reference is made to the above comments.

According to a particularly advantageous design of the disclosure the transponder is arranged in an area inaccessible to a user, preferably an internal region of the cartridge.

The transponder is preferably arranged on an inner side of a part of a cover of the cartridge, wherein the part cannot be non-destructively separated from the cartridge.

Preferably, the first cartridge data is applied to the outer side of the cartridge in the form of a one- or two-dimensional code, in particular in the form of a barcode or a matrix code, such as a QR Code® or DataMatrix™ Code (DMC for short). This has the advantage that the first cartridge data can be scanned in a simple manner using an optical reader of the processing unit. A further advantage is that the application of the first cartridge data to the outside of the cartridge prevents the user from inserting the cartridge in the processing unit before the first cartridge data is read in, if the reader is configured for scanning outside the cartridge.

The subject matter of the disclosure also relates to a processing system comprising a processing unit according to the disclosure and a cartridge according to the disclosure.

BRIEF DESCRIPTION OF THE DRAWINGS

Exemplary embodiments of the disclosure are shown schematically in the drawings and explained in more detail in the following description. The elements that have equivalent function shown in the various figures are labeled with the same reference numerals, and a repeated description of the elements is therefore omitted.

Shown are.

DETAILED DESCRIPTION

Figure 1A:
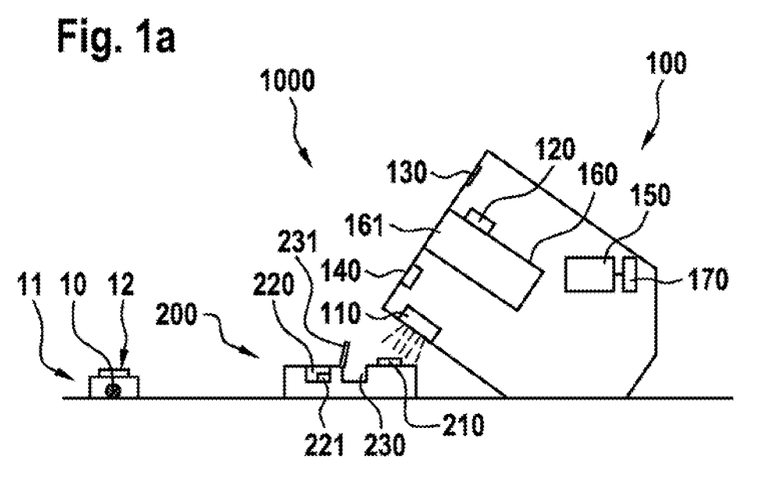
FIGS. 1a and 1b an exemplary embodiment of a processing system according to the disclosure, FIGS. 2a and 2b views of the cartridge from the exemplary embodiment according to FIGS. 1a and 1b, and FIG. 3 an exemplary embodiment of a method according to the disclosure that can be implemented with the processing system according to the disclosure.
Figure 1B:
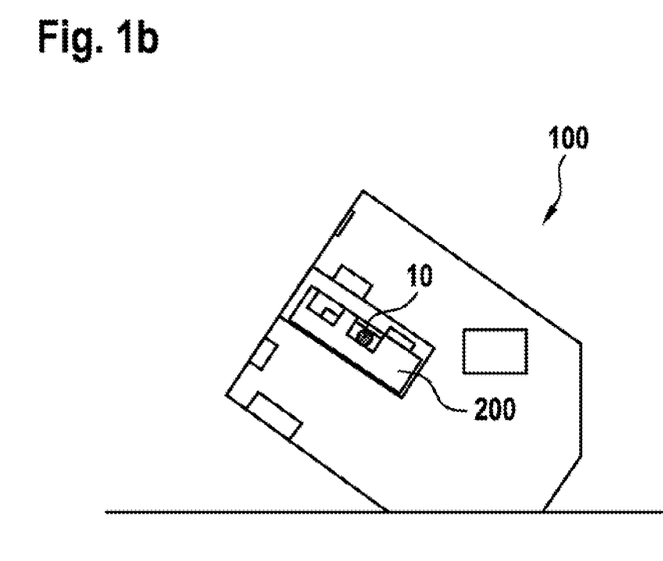

FIGS. 1a and 1b show an exemplary embodiment of a processing system 1000 according to the disclosure, which comprises an embodiment of the processing unit 100 according to the disclosure and an embodiment of the cartridge 200 according to the disclosure.

As shown in FIG. 1a, the processing unit 100 comprises an optical reader 110, such as a barcode scanner or a camera, for scanning machine-readable information. The processing unit 100 also comprises a first transponder 120 for wireless scanning of data, for example a transponder configured for scanning RFID chips, as well as an interaction surface 130, such as a touch-sensitive display screen, also known as a touchscreen, for entering and displaying information. The processing unit 100 can also comprise a loudspeaker 140 for playback of information to the user.

A calculation unit 150 of the processing unit is configured to process the data that is scanned or entered via the reader 110, the first transponder 120 or the interaction surface 130. The calculation unit 150 is connected to a memory 170 of the processing unit 100 and configured to process one or more processing methods stored in the memory 170. Furthermore, the calculation unit 150 is configured to control the processing unit 100 for processing a cartridge 200 received in a bay 160 of the processing unit 100 according to the disclosure, as shown in Figure 1b, according to one of the processing procedures stored in the memory 170. The bay 160 can be closed with a cover plate 161 of the bay 160. The processing unit 100 also has means, not shown, for the microfluidic processing of the cartridge 200. These means may be mechanical, pneumatic or thermal actuators typical in the microfluidics industry for carrying out microfluidic processes in the cartridge, for example plungers, heating elements or compressed air connections.

FIG. 1b also shows an exemplary embodiment of the cartridge 200 as part of the processing system according to the disclosure. The cartridge 200 can comprise a plastic-based layered structure well known in the microfluidics industry. The cartridge 230 has a sample chamber 230 for receiving a biological sample 10, which is to be processed with the aid of the cartridge 200 and the processing unit 100. The sample chamber 230 can be closed with a cover plate 231 of the sample chamber 230. Before inserting the sample 10 into the cartridge 200, the sample 10 can be located, for example, in a sample container suitable for biological samples 11, such as a glass or plastic container. On the sample container 11, sample data 12 can be applied relating to the sample 10, such as a nature of the sample 10 and/or a reference to the sampler donor, for example in a form readable by a human user and/or coded in the form of a label 12 or printed label 12, for example a bar code.

The cartridge 200 in this example has a barcode 210 applied on an outside 240, in this case on a cover plate 240, of the cartridge 200, which codes first coded cartridge data 210. The first cartridge data 210 can, for example, comprise information about the type of the cartridge 210 and/or a processing procedure, analysis method or test procedure that can be performed with the cartridge. In addition, the cartridge 200 comprises a second transponder 220, for example an RFID chip, with a memory 221 in which second cartridge data is stored. The first cartridge data 210 and the second cartridge data include at least one identical identification data set, for example an alphanumeric character string that uniquely identifies the cartridge 200, for example, an ID of the RFID chip.

Figure 2A:
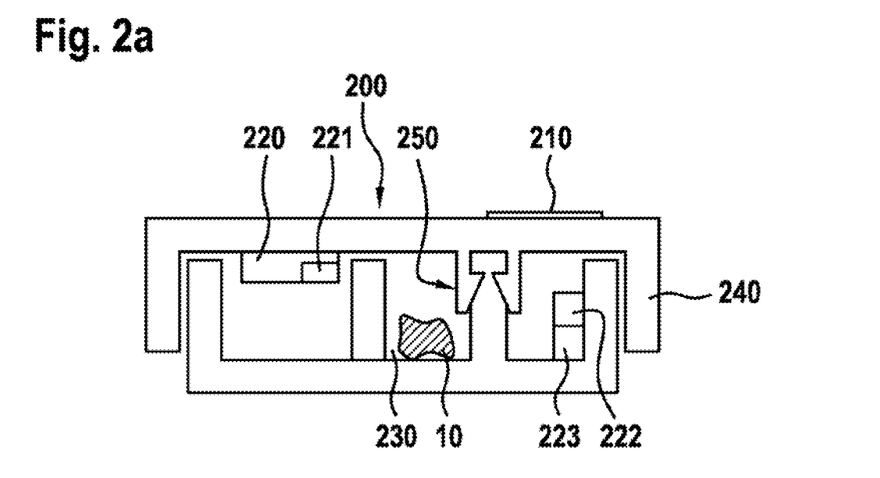
Figure 2B:
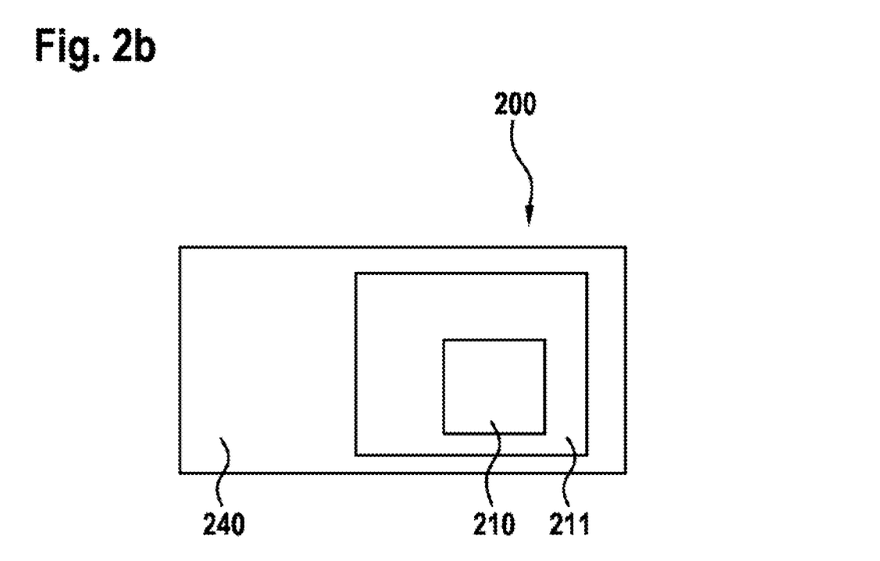

As shown in FIG. 2a, a cover plate 240 of the cartridge 200 is connected to the cartridge 200 via an irreversible snap-in connection 250. The snap-in connection 250 is thus formed in such a way that an opening of the cover plate is only possible by at least partially destroying the snap-in connection 250. The insertion of the sample 10 into the sample chamber 230 must therefore take place before closing the cartridge 200 with the cover plate 240. The second transponder 220 is arranged on the underside of the cover plate 240 facing the cartridge 200, so that after connection of the cover 240 to the cartridge 200 the second transponder 210 is no longer accessible to a user. In FIG. 2b it is apparent that the first cartridge data 210 in this example is applied, for example glued, onto the top side of the cover plate 240, in the form of a two-dimensional barcode 210 as part of a label 211. Alternatively, the first cartridge data 210 could also be stored in a memory 223 of a third transponder 222. As shown in FIG. 2a, the third transponder 222 can be arranged in a different part of the cartridge 200 than on the cover plate 240. In a further alternative, the first cartridge data 210 and the second cartridge data can be the same data, which are stored in the memory 221 of the second transponder 220 and can be read out multiple times.

Figure 3:
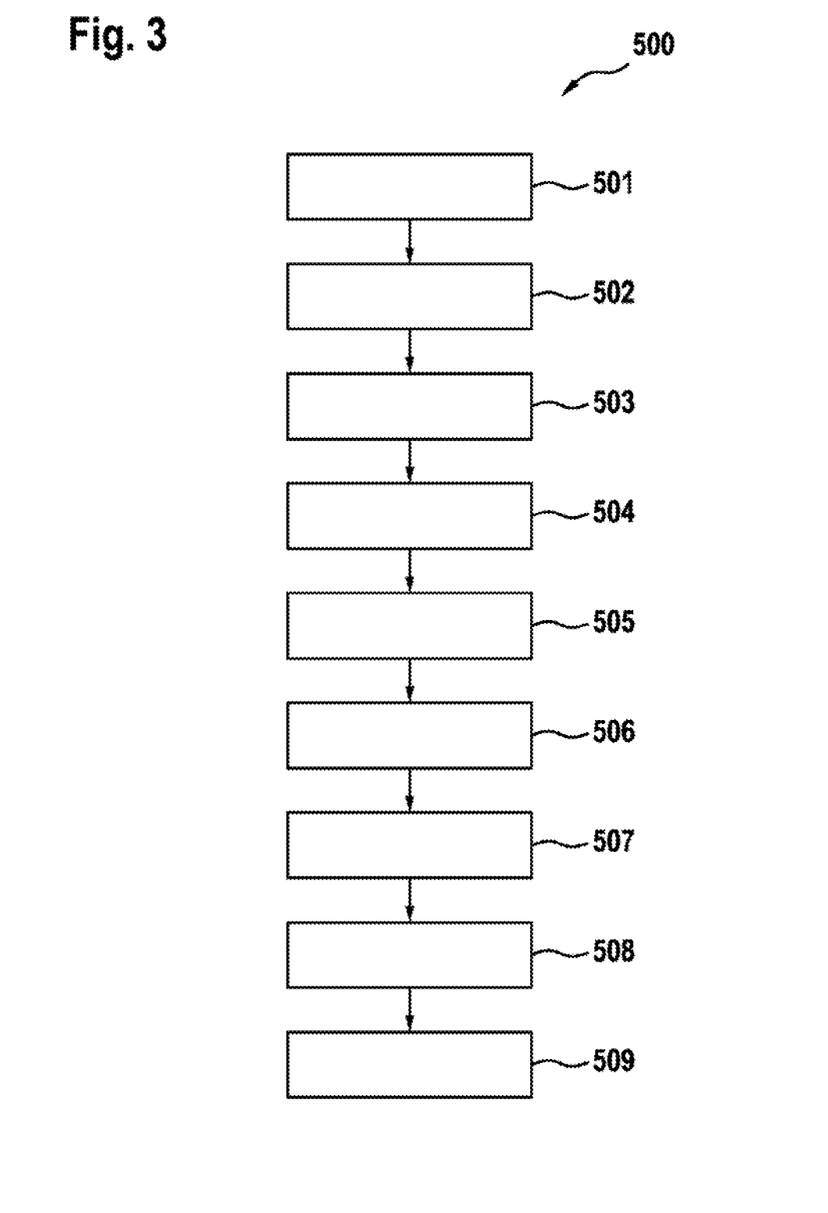

FIG. 3 shows a flow diagram of an exemplary embodiment of the method 500 according to the disclosure, based on the exemplary embodiment of the processing system 1000 according to the disclosure shown in FIGS. 1 and 2.

After a user of the processing system 1000 has received a sample 10 for an analysis with the processing system 1000, in a first step 501 the sample data 12 is entered or scanned into the processing unit 100 before the sample 10 is inserted into the cartridge 100 and before the cartridge 100 is inserted into the processing unit. The biological sample 10 can be, in particular, a blood sample, a urine sample, a saliva sample or a sample taken from a swab. The analysis to be performed can take the form, for example, of an assay, in particular, a molecular-biological assay, for example for detecting a particular substance or specific pathogens such as viruses, bacteria or fungi in the sample. As stated above, depending on the form and encoding of the sample data 12, the sample data 12 can be either entered by the user via the interaction surface 130 or read in by the reader 110 of the processing unit.

In a second step 502, the first cartridge data 210 are scanned into the processing unit 100 via the reader 110.

If the form and coding of the first cartridge data 210 allow it, these can also be alternatively entered by the user via the interaction surface 130. If, as described above, the first cartridge data 210 are alternatively stored in the memory 221 of the second transponder 220 or in the memory 223 of the third transponder 222, this data can be scanned wirelessly via the first transponder 120.

Alternatively, the second step 502 of the entry or scanning of the first cartridge data 210 can also be carried out before the first step 501 of the entry or scanning of the sample data 10.

As described above, the processing unit 100 is configured to load a processing procedure compatible with the first cartridge data 210 from the memory 170 of the processing unit 100. In a third step 503 the sample data 12 is compared against the first cartridge data 210 for compatibility of the sample 10 with the cartridge 20 by means of the calculation unit 150 configured for the purpose. In a fourth step 504, a first error message is issued by the processing unit if no compatibility of the sample 10 with the cartridge can be detected by the processing unit. The message can be issued, for example, optically via a display of the interaction surface 130 or acoustically via the speaker 140 of the processing unit 100. The compatibility of the sample 10 with the cartridge 200 in this context is understood to mean, in particular, that the sample 10 is suitable for the test or analysis that can be performed using the cartridge 200. In addition, the calculation unit 100 is configured to compare an expiry date of the sample 10 and/or the cartridge 100 contained in the sample data 12 and/or the first cartridge data 210 with a current date stored in the calculation unit 150, and if one of the expiry dates is exceeded an error message is issued via the interaction surface 130 or the speaker 140. Preferably, in the event of the expiry date of the cartridge 200 being exceeded, information about the non-usability of the cartridge 200 is stored in the memory 221, 223 of the second or third transponder 220, 222, where this information then forms a part of the first or second cartridge data and can be detected on a further readout of the cartridge data by the processing unit 100. Alternatively, the first and/or second cartridge data 210 in this case can be deleted, or a kill-switch may be set that destroys the second or third transponder 220, 222, which reduces the risk of any further use by the processing unit. In addition, the calculation unit 150 can be configured to detect a predefined information item about an already completed use of the cartridge 200 in the first cartridge data 210 and to issue a corresponding error message to the user. This advantageous configuration of the calculation unit 150 can thus prevent expired samples, expired cartridges or previously used cartridges from being used. This early warning given to the user in the processing procedure in particular reduces the risk that a sample 10 will become unusable by insertion into an unsuitable cartridge 200, or conversely by inserting an unsuitable sample 10 into a cartridge 200 the cartridge 200 might become unusable.

If no error message is issued, in a fifth step 505 the sample 10 is inserted by the user into the cartridge 200 and closed and the cartridge 200 is inserted into the bay 160 of the processing unit 160. In a sixth step 506, the second cartridge data is read out from the memory 221 of the second transponder of the cartridge 200 received into the processing unit 100 via the first transponder 120.

In a seventh step 507 a comparison of the first cartridge data 210 with the second cartridge data for the identical identification data set is carried out by the calculation unit 150 of the processing unit 100 configured for this purpose. If the first cartridge data 210 and the second cartridge data do not include the identical identification data set, in an eighth step 508 a second error message is issued by the processing unit 100. This means it is advantageously detected whether the received cartridge 200 is the same cartridge 200 whose first cartridge data 210 was entered or read into the processing unit 100. In addition, the calculation unit 150 can be configured to detect a predefined information item about an already completed use of the cartridge 200 in the second cartridge data also, and to issue a corresponding error message to the user.

If no error message has been issued, in a ninth step 509 the further processing of the cartridge 200 and the received sample 10 can be carried out by the processing unit 100.

Preferably, after the completion of the processing, in a tenth step 510 a predefined information item about the completed use of the cartridge 200 is stored in the memory 221, 224 of the first or, where available, second transponder 220, 222 of the cartridge 200. This information then forms a part of the first or second cartridge data. This has the advantage that in the event of a mistakenly attempted re-use of the same cartridge 200, a previously completed usage can be detected by the processing unit 100, as stated above.

The invention claimed is:

1. A method for processing a cartridge and a biological sample received into the cartridge, with a processing unit, comprising:

before inserting the sample into the cartridge and before the cartridge is received into the processing unit:
    entering or scanning sample data into the processing unit;
    entering or scanning first cartridge data into the processing unit using a first scanning device of the processing unit; and
    comparing the sample data against the first cartridge data, via the processing unit, to determine a compatibility of the sample with the cartridge; and
selectively, with reference to the determined compatibility:
    in response to determining no compatibility of the sample with the cartridge via the processing unit, outputting a first error message via the processing unit;
    in response to no output of the first error message:
        inserting the sample into the cartridge;
        inserting the cartridge into the processing unit for further processing,
    scanning second cartridge data from the cartridge into the processing unit after inserting the cartridge into the processing unit using a second scanning device of the processing unit;
        comparing the first cartridge data with the second cartridge data, via the processing unit, to determine whether the second cartridge data includes an identical identification data set with the first cartridge data; and
        in response to the second cartridge data not including the identical identification data set with the first cartridge data, outputting a second error message via the processing unit.

2. The method as claimed in claim 1, wherein in response to completion of the further processing, depositing first information about the completed processing of the cartridge in a memory.

3. The method as claimed in claim 1, wherein in response to a determination that the cartridge is unusable during processing of the first or second cartridge data, storing second information about the non-usability in a memory of the cartridge.

4. The method as claimed in claim 1, further composing:
selectively issuing an error message, via the processing unit, in response to either of (i) a determination of non-usability of the cartridge during processing of the first or second cartridge data, and (ii) detecting second information about already completed use of the cartridge during processing of the first or second cartridge data.

5. The method as claimed in claim 1, further comprising:
comparing, via the processing unit, an expiry date of the cartridge included in the first or second cartridge data is compared with a current date; and
in response to a determination that the current date exceeds the expiry date, issuing an error message via the processing unit.

6. The method as claimed in claim 1, wherein the first cartridge data is read in via an optical scanning of the first cartridge data applied to an outer side of the cartridge.

7. The method as claimed in claim 1, further comprising:
selectively setting a kill-switch configured to irreversibly destroy a transponder comprising one or more of the first and second cartridge data in response to either of:
    a determination that an expiry date of the cartridge is exceeded; and
    an already completed use of the cartridge is detected by the processing unit.

8. The method as claimed in claim 1, wherein:
one or more of the first and second cartridge data is stored in a memory of the cartridge; and
the method further comprises deleting the one or more of the first and second cartridge data in response to a determination that either of:
    an expiry date of the cartridge has been exceeded; and
    first information about already completed use of the cartridge is detected by the processing unit.

9. The method of claim 1, wherein the cartridge is a microfluidic cartridge.

10. The method of claim 2, wherein the first information is deposited as a part of the first or second cartridge data.

11. The method of claim 3, wherein the second information is deposited as a part of the first or second cartridge data.

12. The method of claim 6, wherein the first cartridge data is applied to the cartridge in the form of a one- or two-dimensional code.

13. A method for processing a cartridge and a biological sample received into the cartridge, with a processing unit, comprising:
before inserting the sample into the cartridge and before the cartridge is received into the processing unit:
    entering or scanning sample data into the processing unit;
    entering or scanning first cartridge data into the processing unit; and
    comparing the sample data against the first cartridge data, via the processing unit, to determine a compatibility of the sample with the cartridge; and
selectively, with reference to the determined compatibility:
    in response to determining no compatibility of the sample with the cartridge via the processing unit, outputting a first error message via the processing unit; and
    in response to no output of the first error message:
        inserting the sample into the cartridge; and
        inserting the cartridge into the processing unit for further processing,
    wherein in response to completion of the further processing, depositing first information about the completed processing of the cartridge in a memory of the cartridge.

* * * * *

UNITED STATES PATENT AND TRADEMARK OFFICE
CERTIFICATE OF CORRECTION

| | |
|---|---|
| PATENT NO. | : 11,320,444 B2 |
| APPLICATION NO. | : 16/349011 |
| DATED | : May 3, 2022 |
| INVENTOR(S) | : Schulz et al. |

It is certified that error appears in the above-identified patent and that said Letters Patent is hereby corrected as shown below:

In the Claims

In Claim 4, at Column 9, Line 43: "further composing:" should read --further comprising:--.

Signed and Sealed this
Eleventh Day of October, 2022

Katherine Kelly Vidal
*Director of the United States Patent and Trademark Office*